Dec. 9, 1930.    E. J. O'NEILL    1,784,494
MACHINE FOR CUTTING ANGULAR ENDS
Filed Sept. 27, 1928    2 Sheets-Sheet 1
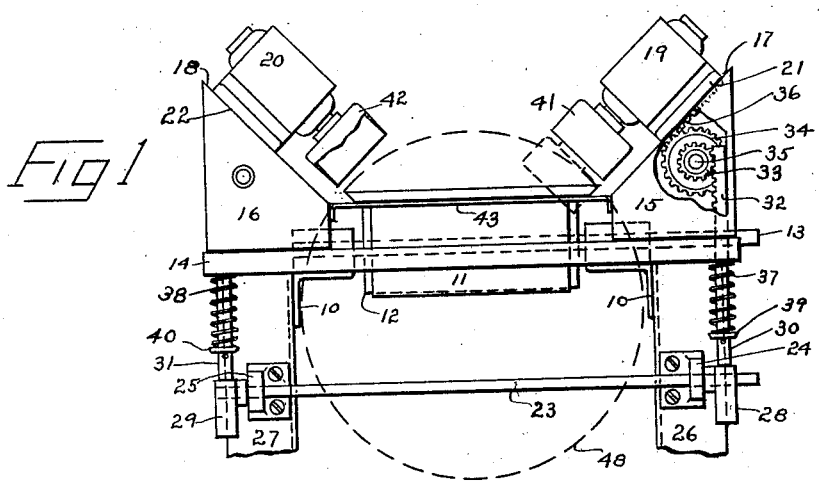
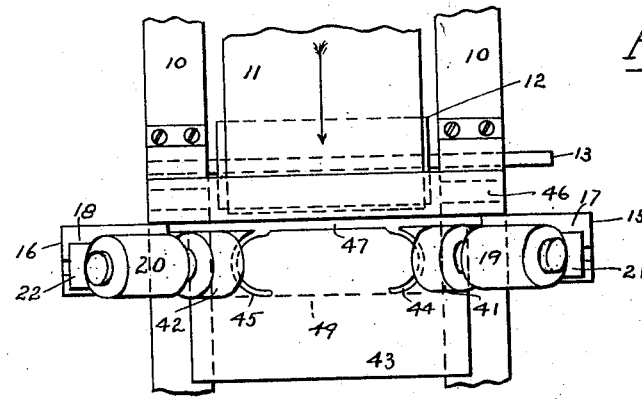
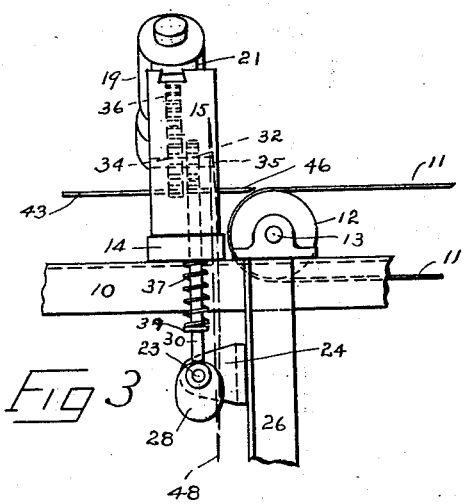
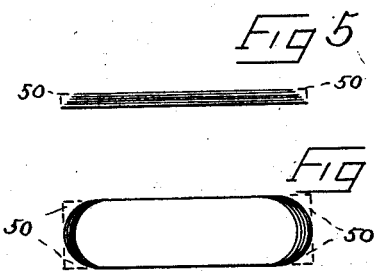
INVENTOR
Edward J. O'Neill,
BY
ATTORNEY

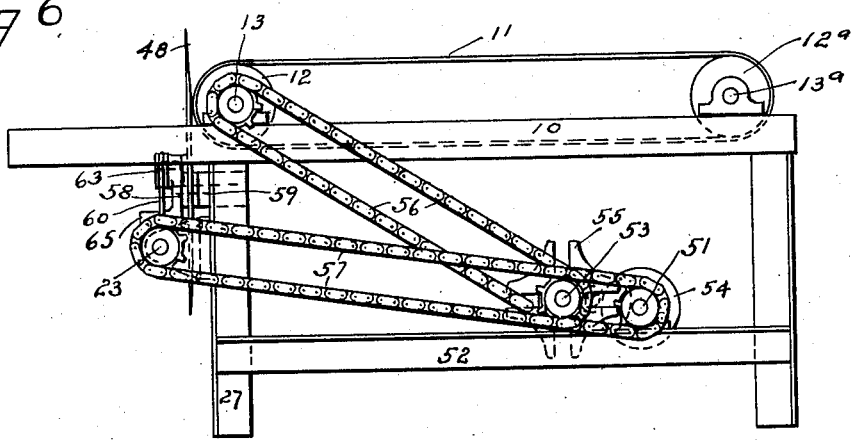
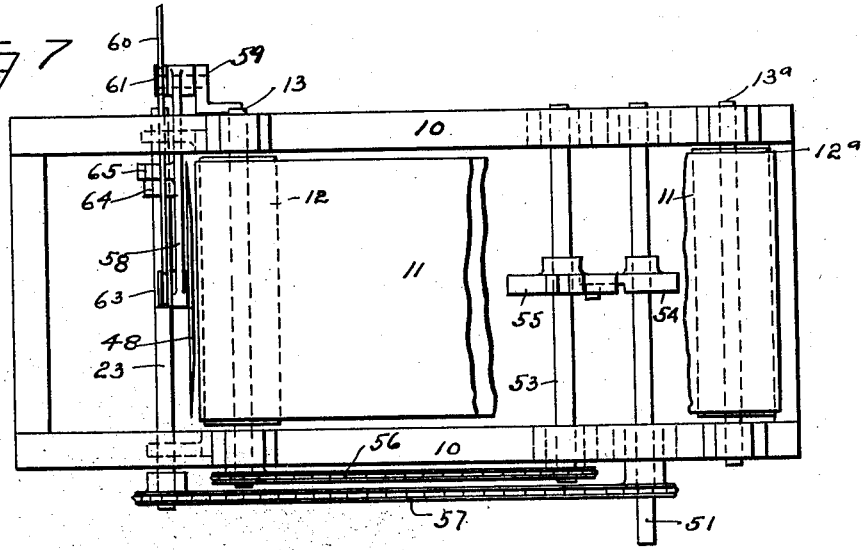
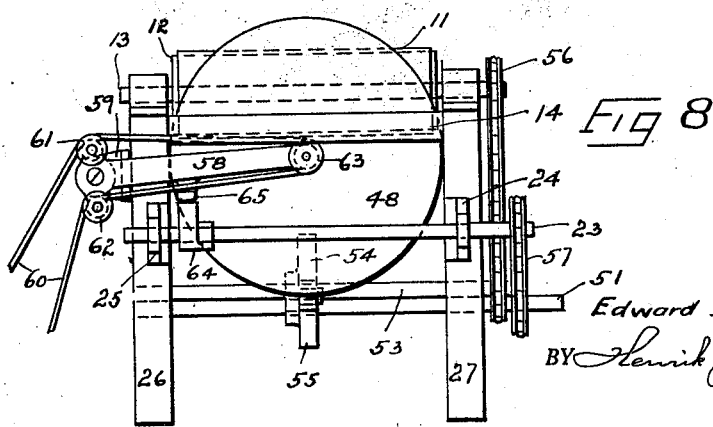

Patented Dec. 9, 1930

1,784,494

UNITED STATES PATENT OFFICE

EDWARD J. O'NEILL, OF SYRACUSE, NEW YORK, ASSIGNOR TO STERILEK COMPANY, INC., OF BROOKLYN, NEW YORK, A CORPORATION OF NEW YORK

MACHINE FOR CUTTING ANGULAR ENDS

Application filed September 27, 1928. Serial No. 308,835.

My invention relates to cutting machines and has for its main object to provide a machine for cutting the ends on fillers for sanitary napkins and other commodities. A further object is to provide a machine which, while complete in itself, may be used as an attachment on cutting machines of standard types. A still further object is to provide a machine thoroughly automatic in its operations, simple in construction, economic to operate, and comparatively inexpensive to manufacture.

These and other objects and advantages will be readily understood from the following description and from the accompanying drawing of a preferred embodiment, but it will be noted that various modifications might be made without departing from the scope of the invention. In the drawing Fig. 1 is and end view of the machine,
Fig. 2 is a plan view of same,
Fig. 3 is a side elevation,
Fig. 4 is a plan view of one of the fillers made on the machine,
Fig. 5 is a side view of Fig. 4,
Fig. 6 is a side elevation showing the driving and timing mechanism,
Fig. 7 a plan view of Fig. 6, and
Fig. 8 a front view of Fig. 6.

Referring first to Figs. 1 to 3, 10 shows fragments of the frame of a standard cutting machine, 11 the conveyer belt, 12 the drum and 13 the drum shaft of such a machine. The special machine now to be described is attached to the forward end of the frame 10. It consists of a cross-bar 14 on which are mounted two gear housings 15 and 16. The upper faces of these housings are machined with an inwardly sloping angle and on these angular faces electric motors 19 and 20 are slideably mounted. The bases 21 and 22 of the motors are dovetailed into the angular faces 17 and 18.

Sliding movements are imparted to the motors by the following mechanism. A cam shaft 23, rotating in bearings 24 and 25 which are mounted on the legs 26 and 27, is provided with two cams 28 and 28 which are secured near its ends. Two rods 30 and 31 engage on the operating faces of the cams and are actuated as these revolve. These rods, the lower parts of which are round and guided in holes reamed in the cross-bar 14, are rectangular at their upper ends and provided with a gear rack 32. This rack is plainly shown in the housing 15 where a part has been broken away to show the interior, but, as the mechanism in both housings is similar, it has been omitted in housing 16.

The rack 32 actuates a gear 33 secured against rotation to another and larger gear 34. These gears rotate on a shaft 35. The large gear engages in a rack 36 secured to the base of the motor. It will plainly be seen that the rotation of the cams will cause a sliding movement to the motors. Compression springs 37 and 38, abutting against the lower side of the cross-bar 14 and the washers 39 and 40 which are secured on the rods 30 and 31, keep the rods in continuous contact with their respective cams. These springs have sufficient power to return the motors to their normal or inactive position, as shown on the drawing.

Two cup shaped and knife-edged cutters 41 and 42 are mounted on the spindles of the motors. The cutter 42, on which a part has been broken away, plainly shows the shape and construction of these cutters. A cutting table 43 is secured between the housings 15 and 16 and is provided with semi-circular slots 44 and 45 into which the edges of the cutters enter when the motors descend. An apron 46 connects the cutting table with the conveyer belt 11. A slot 47 is provided between the apron and the table so that the rotary cutter, which is indicated by dotted lines at 48, may be brought up to cut the material operated on.

Reference is now made to Figs. 6, 7 and 8 in which the driving mechanism as well as the mechanism actuating the cutter 48, is shown in detail. In these views the rear drum 12a and its shaft 13a are also shown. The main shaft 51, to which the power is applied, is mounted in bearings located on the side supports 52, as is also another shaft 53. The driving member 54 of a Geneva gear is secured on shaft 51 while the driven member 55 is secured on shaft 53. Intermittent motion is therefore imparted to this shaft. The shaft 53 imparts its motion to the drum shaft 13 by means of a chain 56 which engages on sprocket wheels secured on the ends of these shafts. The cam shaft 23 is driven directly from the main shaft by a chain 57 which likewise engages on sprocket wheels secured on these shafts.

The cutter 48 is mounted on the outer end of a swinging lever 58, the other end of which is mounted on a bracket 59 secured on the leg 26. A round belt 60, which passes over idlers 61 and 62 and a pulley 63, drives the cutter at high speed. The lever 58 is lifted and lowered by a cam 64, secured on the cam shaft 23, which engages on a sidewardly extending arm 65 cast integral with the lever. This cam is timed in proper relation to the cams 28 and 29.

The machine works in the following manner. The material to be cut is moved forward on the conveyer belt in the direction indicated by the arrow. The movement of the belt is intermittent. When the material reaches the point indicated by the dotted line 49, the belt stops. The cam shaft now revolves and causes the motors, and consequently the cutters, to descend. Finally the cutter 48 is raised and the material severed. Referring now particularly to Figs. 4 and 5, which shows the finished fillers, it will be seen that as the cutters, which are rotated at high speed, descend they remove the portions marked 50, thus leaving the finished material with rounded and chamfered ends.

While I have shown and described a machine for rounding and chamfering the ends of rectangular pieces, it will readily be seen that the machine might be constructed for rounding and chamfering the corners of pieces of different shapes.

Having described my invention and its operation, what I claim as new and wish to protect by Letters Patent is:

1. In a cutting machine of the class described, a cutting table, one or more cup shaped, knife-edged cutters mounted at an angle to the said cutting table, means for rotating and means for angularly raising and lowering said cutter or cutters in relation to the cutting table.

2. In a cutting machine of the class described, a cutting table, an angular support mounted on each side of said cutting table, electric motors guided and slideably mounted on the angular faces of said supports, cup shaped and knife-edged cutters mounted on and rotated by said motors, and means for reciprocating said motors on said angular supports.

3. In combination, an intermittently moving conveyor belt, a cutting table for receiving material from said belt, a cutter disposed adjacent to said table for severing the material deposited thereon, one or more cutters mounted at an angle with the face of said cutting table and each comprising a cup-shaped member having a knife-edge formed at its rim, means for rotating and for angularly raising and lowering said last referred to cutter or cutters, and means for timing and raising and lowering of said cutters in fixed relation to the intermittent movement of the conveyor belt.

EDWARD J. O'NEILL.